(12) United States Patent
Ubaldi

(10) Patent No.: US 9,668,422 B2
(45) Date of Patent: Jun. 6, 2017

(54) CONVEYOR UNIT FOR DEVICES FOR HARVESTING FINE-STEMMED AND LONG AGRICULTURAL PRODUCTS AND HARVESTING DEVICE COMPRISING SAID UNIT

(71) Applicant: ROC S.R.L., Poggio Berni (Rimini) (IT)

(72) Inventor: Raffaele Ubaldi, Santa Giustina di Rimini (IT)

(73) Assignee: ROC S.R.L., Poggio Berni (IT)

( * ) Notice: Subject to any disclaimer, the term of this patent is extended or adjusted under 35 U.S.C. 154(b) by 698 days.

(21) Appl. No.: 14/060,292

(22) Filed: Oct. 22, 2013

(65) Prior Publication Data

US 2014/0109543 A1   Apr. 24, 2014

(30) Foreign Application Priority Data

Oct. 24, 2012 (IT) .............................. RN2012A0050
Aug. 8, 2013 (EP) ..................................... 13179787

(51) Int. Cl.
*A01D 80/00* (2006.01)
*A01D 89/00* (2006.01)

(52) U.S. Cl.
CPC ......... *A01D 89/008* (2013.01); *A01D 89/002* (2013.01)

(58) Field of Classification Search
CPC ..... A01D 45/00; A01D 89/002; A01D 89/008
USPC .......... 56/376, 16.4 A–16.4 C, 16.4 R, 14.3, 56/14.4, 13.9, 14.1, 17.3
See application file for complete search history.

(56) References Cited

U.S. PATENT DOCUMENTS

| | | | | |
|---|---|---|---|---|
| 981,643 A * | 1/1911 | Hamilton | ...................... | 100/176 |
| 1,690,828 A * | 11/1928 | Maxwell | ................... | 100/162 R |
| 3,732,670 A * | 5/1973 | Milliken et al. | ........... | 56/16.4 C |
| 3,952,482 A * | 4/1976 | Quick | ............................ | 56/13.9 |
| 4,150,524 A * | 4/1979 | Sawyer | ............................... | 56/1 |
| 4,257,215 A * | 3/1981 | Maher et al. | .................. | 56/14.4 |
| 4,910,951 A | 3/1990 | Reilly et al. | | |
| 4,929,904 A * | 5/1990 | Bohman et al. | .............. | 324/696 |
| 5,090,187 A | 2/1992 | Mews | | |

(Continued)

FOREIGN PATENT DOCUMENTS

| | | |
|---|---|---|
| DE | 100 21 748 A1 | 11/2001 |
| EP | 0 116 514 A1 | 8/1984 |
| GB | 2 215 971 A | 10/1989 |

*Primary Examiner* — Thomas B Will
*Assistant Examiner* — Mai Nguyen
(74) *Attorney, Agent, or Firm* — Pearne & Gordon LLP

(57) ABSTRACT

A device for harvesting long agricultural products, such as grass, straw, pulses, biomass products and the like, includes a frame having a main axis of extension, a plurality of agricultural product harvesting elements, each in turn equipped with at least one long harvesting prong, a movement system for moving each of the harvesting elements along a closed trajectory surrounding the main axis of extension, and a plurality of bands fixed to the frame, positioned one after another and spaced out along the main axis of extension. The device also includes a conveyor unit including an elongate body extending along its own axis of rotation and provided with at least one peripheral step forming an agricultural product feed shoulder extending, along an axis which is substantially radial relative to said axis of rotation, between an edge proximal to the axis of rotation and an edge distal from the axis of rotation.

14 Claims, 7 Drawing Sheets

(56) References Cited

U.S. PATENT DOCUMENTS

| | | | |
|---|---|---|---|
| 5,419,106 A * | 5/1995 | Gemelli | 56/16.4 B |
| 5,992,133 A * | 11/1999 | Walch et al. | 56/6 |
| 6,251,008 B1 * | 6/2001 | Mietzel | 460/32 |
| 6,499,283 B1 * | 12/2002 | Cook | 56/16.4 B |
| 8,181,435 B1 | 5/2012 | McClure et al. | |
| 2002/0025840 A1 | 2/2002 | Beck | |
| 2005/0097874 A1 * | 5/2005 | Priepke | 56/16.4 B |

* cited by examiner

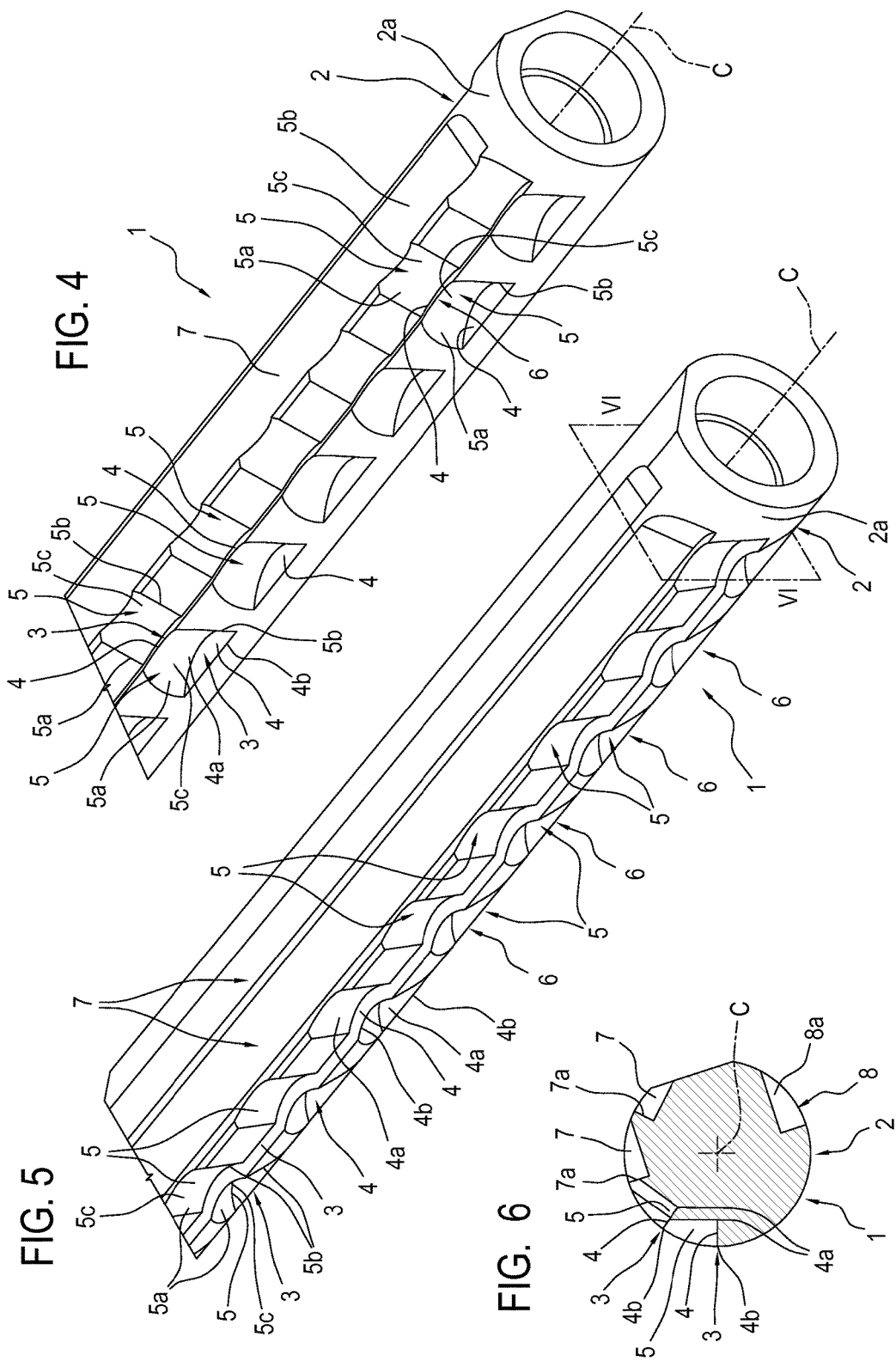

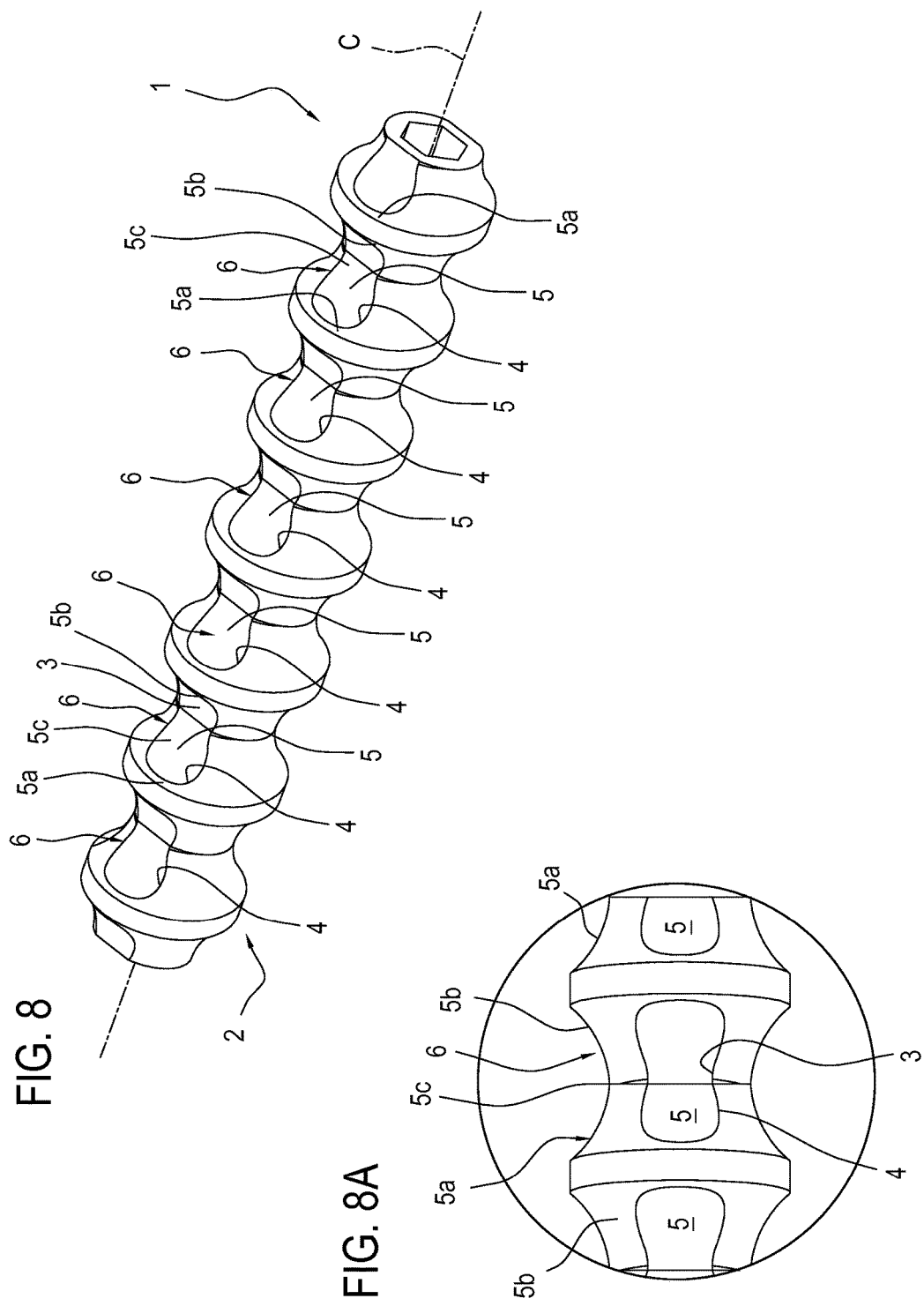

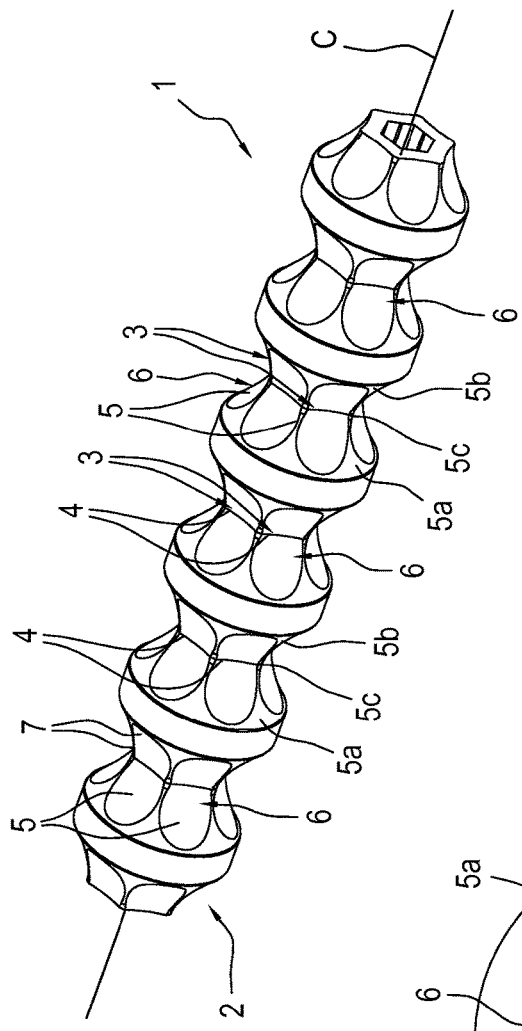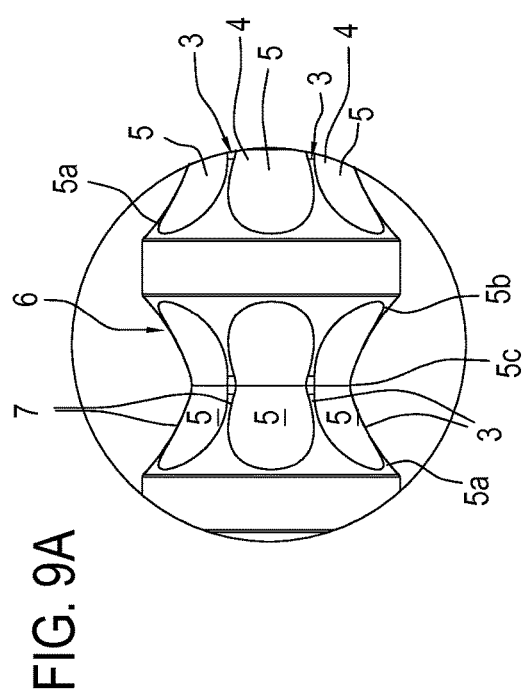

CONVEYOR UNIT FOR DEVICES FOR HARVESTING FINE-STEMMED AND LONG AGRICULTURAL PRODUCTS AND HARVESTING DEVICE COMPRISING SAID UNIT

BACKGROUND OF THE INVENTION

This invention relates to a conveyor unit for a device for harvesting long agricultural products, such as grass, straw, pulses, biomass products and the like, and a harvesting device which uses said unit.

Harvesting devices are normally used for harvesting from the ground grass, straw, hay (cut by other machines) or for harvesting pulses; in any case for harvesting similar agricultural products (usually plants), with a long shape.

For that purpose they are connected to a pulling vehicle (such as a tractor or a self-propelled agricultural machine) and moved by it.

The prior art harvesting devices have a preferred axis of extension which, during use, remains transversal to the axis of movement of the pulling vehicle and, to lift off the ground and move (before unloading) the agricultural products, said harvesting devices use a plurality of harvesting elements associated with them and which are moved by a movement system. The movement system is usually driven by a universal joint or the like which, by means of a power take-off, takes driving power from the engine of the pulling vehicle.

Each harvesting element is, in turn, equipped with one or more prongs arranged side by side. The harvesting elements (and the related prongs) are usually positioned around the preferred axis of extension along rows parallel with the preferred axis of extension. Each harvesting element (and the related prongs) is moved by the movement system along a closed trajectory surrounding the preferred axis of extension. The prongs are straight elements with one end hooked (directly or by means of parts of the related harvesting element) to the movement system, whilst the opposite end is free.

Moreover, operatively downstream of the harvesting elements, the devices may comprise means for unloading the agricultural products harvested, such as windrowers, presses, silage cutters or conditioners.

Such unloading means are usually movement devices such as conveyor belts, chains or screw feeders positioned along the axis of extension of the harvesting device and positioned at a harvesting element product release point to allow the products to be conveyed to the sides of the pulling vehicle, or to the centre.

Alternatively, operatively downstream of the harvesting elements there could be an operating machine, such as a baler, a cutter or a chamber for receiving the agricultural products harvested.

Disadvantageously, the prior art devices have critical points both relating to the transit of the products exiting the harvesting elements and relating to the cleanness of said transit zone.

In fact, it is often the case that the agricultural products, once released by the harvesting elements, are not immediately channelled onto the unloading means, but remain in the transit zone, getting jammed and causing a gradual deterioration in device performance.

SUMMARY OF THE INVENTION

The aim of this invention is to provide a conveyor unit and a harvesting device for agricultural products which overcome the above-mentioned disadvantages of the prior art.

In particular, the aim of this invention is to provide a conveyor unit and a harvesting device for agricultural products which give high performance and are easy to make.

Moreover, the aim of this invention is to provide a conveyor unit which is particularly forceful with the agricultural products and self-cleaning.

Said aims are fulfilled by the conveyor unit according to this invention, comprising an elongate body extending along its own axis of rotation and provided with at least one peripheral step forming an agricultural product feed shoulder extending, along an axis substantially radial relative to said axis of rotation, between an edge proximal to the axis of rotation and an edge distal from the axis of rotation. Said step is shaped in such a way that said feed shoulder is active on the products during rotation of the elongate body in a first direction and is inactive on the products during rotation of the elongate body in a second direction, opposite to the first.

More precisely, the step is shaped in such a way that the feed shoulder is active on the product when the direction of rotation of the elongate body is coming out of the shoulder. In other words, the feed shoulder is active when it is "exposed", whilst it is inactive when it is covered by the profile of the elongate body.

Advantageously, in that way the conveyor unit may be used with alternating motion (that is to say, rotating alternately one way then the other in a first and a second direction which are opposite to each other) in such a way that the feed shoulder passes through a harvesting elements release zone both in the first direction, for feeding them, and in the second direction, for repositioning itself without acting on them.

It should be noticed that the use of alternating motion allows the harvesting device to be kept cleaner.

Therefore, the conveyor unit comprises movement means designed to make it rotate in alternating directions.

Preferably, the step is formed by a plurality of grooves arranged side by side and positioned one after another along said axis of rotation. Alternatively, the step could be formed by a (continuous) slot made on the periphery of the elongate body and extending parallel with the axis of rotation.

In other words, the step extends continuously (as a slot) or in separate portions (grooves) along the axis of rotation in such a way that it is active along the entire extension of the elongate body.

In the preferred embodiment, in which the step is formed by a plurality of grooves, each grove comprises a pair of lateral sides angled towards a middle portion of the groove for guiding, during a rotation of the elongate body about its own axis of rotation, said agricultural products towards a centre of the groove, creating an agricultural product feed effect.

Therefore, each groove forms a cradle on the periphery of the elongate body comprising at least two lateral sides and at least one feed shoulder, substantially parallel with the axis of rotation and transversal to the lateral sides.

As already indicated, the conveyor unit is part of a device for harvesting long agricultural products such as grass, straw, legumes, biomass products and the like, of the type which can be pulled by a pulling vehicle.

Said device comprises a frame having a main axis of extension which, during use, remains transversal to the axis of movement of the pulling vehicle, a plurality of agricultural product harvesting elements, each in turn equipped with at least one long harvesting prong, a movement system for moving each of the harvesting elements along a closed trajectory surrounding the main axis of extension, where the closed trajectory comprises a stretch for conveying the agricultural product between a point where the product is picked up off the ground by the long prongs and a point where the prongs release the agricultural product, and a plurality of bands fixed to the frame, positioned one after another along the main axis of extension and spaced out in such a way that each harvesting element is at least partly interposed between two bands located one after the other.

Therefore, the device according to the invention comprises the conveyor unit, located close to the release point and positioned in such a way that its axis of rotation is aligned with said main axis of extension of the frame at a height such that the elongate body is at least partly projecting above an end stretch of each band located at the release point.

More precisely, the elongate body is positioned in such a way that its axis of rotation is coplanar with said end stretch of each band located at the release point.

Advantageously, in that way the conveyor unit feeds the products efficiently, preventing the products from getting stuck close to the release point and lifting them relative to a harvesting elements manoeuvring zone (that is to say, the area where they rotate), where they are hidden between the bands.

In accordance with the above, it should be noticed that, preferably, the device comprises movement means designed for rotating the elongate body about the axis of rotation with alternating motion in a first direction and a second direction which are opposite to one another.

Preferably, the movement means comprise a transmission unit operatively interposed between the movement system and the elongate body and designed to convert the repetitive rotary motion of the harvesting elements into an alternating rotary motion of the elongate body.

BRIEF DESCRIPTION OF THE DRAWINGS

This and other features of the invention will become more apparent from the following detailed description of a preferred, non-limiting example embodiment of it, with reference to the accompanying drawings, in which:

FIGS. 4, 5 and 6 are respectively two perspective views in two different angular positions and a cross-section of a conveyor unit for devices for harvesting agricultural products according to this invention;

FIGS. 8 and 8A are a perspective view and a detail of an alternative embodiment of a conveyor unit according to this invention;

FIGS. 9 and 9A are a perspective view and a detail of another alternative embodiment of a conveyor unit according to this invention.

DESCRIPTION OF THE PREFERRED EMBODIMENTS

Figure 1:
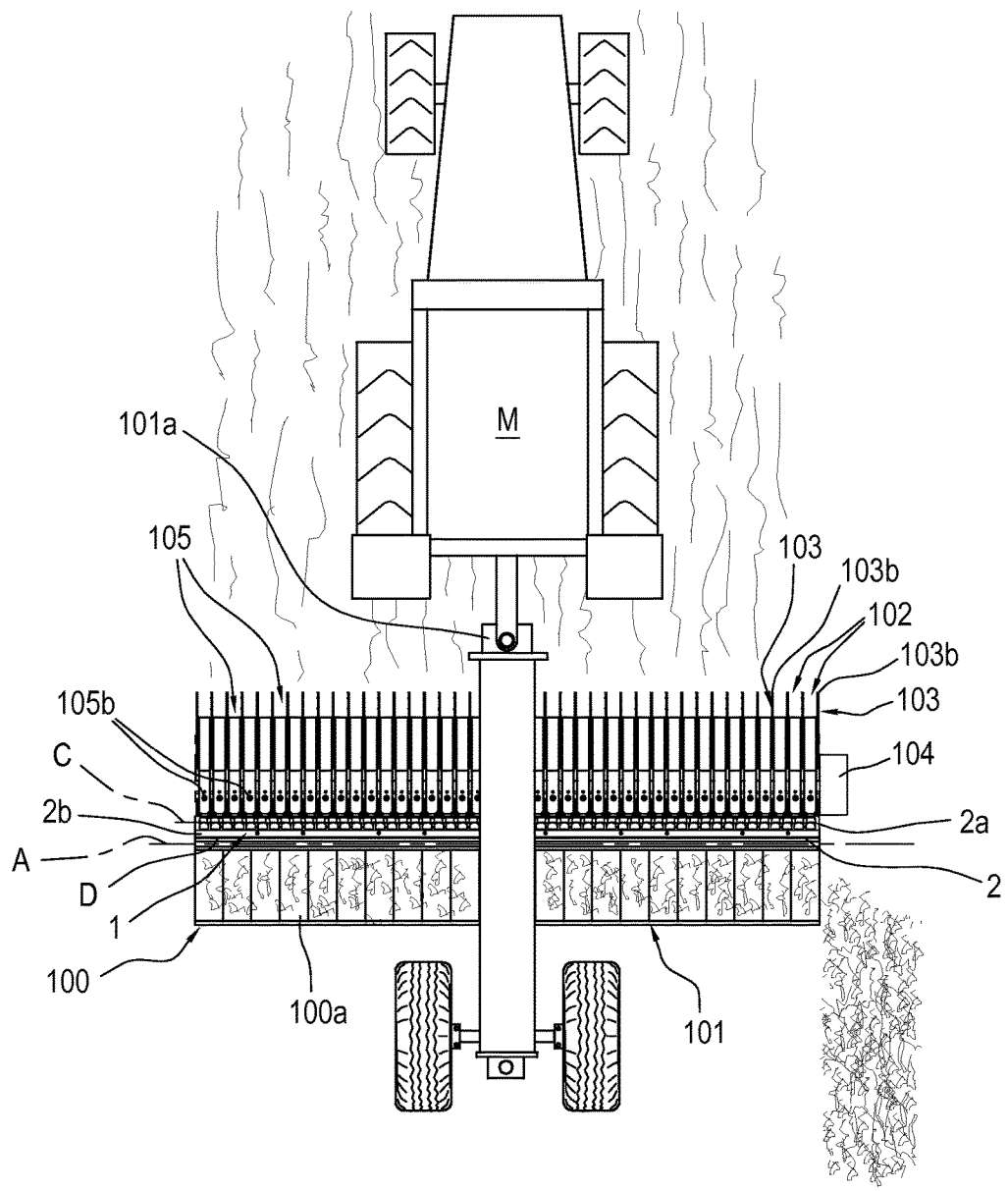
FIG. 1 is a schematic top view of a device for harvesting agricultural products according to this invention, mounted on a windrower.

With reference to the accompanying drawings, the numeral 1 denotes a conveyor unit for devices 100 for harvesting agricultural products according to this invention.

The conveyor unit 1 is located inside a device 100 for harvesting long agricultural products, such as grass, straw, pulses, biomass products and the like.

In other words, the harvesting device 100 is of the type which can be moved by a pulling vehicle along a lying path of a plurality of long and preferably fine-stemmed agricultural products, the harvesting device 100 being designed to lift them off the ground using suitable harvesting elements 102, conveying them onto suitable unloading means or into a receiving chamber by means of a suitable movement system.

More precisely, the device comprises a frame 101 having a main axis of extension "A" which, during use, is kept transversal to the axis of motion of the pulling vehicle "M". Said frame 101 is preferably associated with the pulling vehicle by hooking means 101a projecting transversally (preferably orthogonally) to the main axis of extension "A".

The device 100 also comprises a plurality of agricultural product harvesting elements 102, each in turn equipped with at least one long harvesting prong 103.

It should be noticed that the harvesting elements 102 are arranged one after another along the main axis of extension "A" (spaced out, preferably with an equal distance between each of them).

Advantageously, in that way the harvesting elements 102 are arranged along the extension of the device, increasing the working portion of it.

Preferably, each harvesting element 102 comprises a plurality of long prongs 103 (or forks) extending along a line of extension "B" between a first end 103a and a second end 103b.

The prongs 103 are preferably arranged about the same central axis of rotation, being angled radially relative to it like spokes.

For that purpose, the harvesting device 100 comprises a movement system 104 for moving each of the harvesting elements 102 along a closed trajectory surrounding the main axis of extension "A" (corresponding to the above-mentioned central axis).

More precisely, the movement system 104 is designed to move the prongs 103, making them rotate (even eccentrically) about said central axis (axis of extension "A").

Therefore, said system 104 comprises at least one rotation shaft positioned along said axis of extension "A" of the frame 101 and actuator means connected to it.

The actuator means may be of the electric or hydraulic type, or they may be formed by a transmission system connected to the power source of the pulling vehicle "M" (for example by a universal joint).

Therefore, the closed trajectory comprises a stretch for conveying the agricultural product between a point "P" where the product is picked up from the ground by the long prongs 103 and a point "D" where the agricultural product is released by the prongs 103.

In other words, during its movement (imparted by the system 104) each harvesting element 102 defines a closed trajectory comprising at least one pickup point "P", in use at a lower height which is proximal to the ground, and at least one release point "D", in use at a higher height, distal from the ground.

It should be noticed that the stroke of each prong 103 from the pickup point "P" to the release point "D" is substantially an outward (or conveying) stroke, whilst the stroke of each prong 103 from the release point "D" to the pickup point "P" is substantially a return (or home) stroke.

Preferably, the pickup points "P" of the harvesting elements 102 are aligned with each other along an axis parallel with the axis of extension "A". Therefore, they form a pickup line.

Similarly, the release points "D" of the harvesting elements 102 are aligned with each other along an axis parallel with the axis of extension "A". Therefore, they form a release line.

In addition, the harvesting device 100 comprises a plurality of bands 105 fixed to a frame 101, arranged side by side along said main axis of extension "A" and spaced out in such a way that each harvesting element 102 is at least partly interposed between two bands 105 located one after the other.

Said bands 105 are formed by curved elements shaped in such a way that they surround the axis of extension "A" at least at the outwards stroke of the prongs 103 (that is to say, the closed trajectory).

In other words, the bands 105 are arched elements extending from a lower end stretch 105a, in use placed at a height lower than the axis "A", to an upper end stretch 105b, in use placed at a height higher than the axis "A".

Preferably, the plurality of bands 105 arranged side by side forms a surface which at least partly covers the movement system 104. In the (preferred) embodiment illustrated, each band 105 is positioned between two consecutive long prongs 103 along the axis of extension "A". Therefore, between two consecutive bands 104 there is a space for the free movement of each long prong 103 along the trajectory.

According to the invention, the device 100 comprises at least one conveyor unit 1 positioned close to the release point "D" (preferably close to the release line).

The conveyor unit 1 comprises an elongate body 2 extending along its own axis of rotation "C" and provided with at least one peripheral step 3 forming an agricultural product feed shoulder 4.

The feed shoulder 4 extends, along an axis which is substantially radial relative to said axis of rotation "C", between an edge 4a proximal to the axis of rotation "C" and an edge 4b distal from the axis of rotation "C".

It should be noticed that in this text the term "radial" is not intended to limit the orientation of the wall to a purely radial one, that is to say extending from the axis of rotation "C", but refers to any wall extending between an edge distal to and an edge proximal to the axis of rotation "C".

Advantageously, the presence of the conveyor unit 1, provided with the step 3, facilitates the release of the agricultural products by the harvesting elements 102 (feeding them), and also keeps clean both the harvesting elements 102 and the area around the release point "P".

Preferably, the step 3 extends along the axis of rotation "C", substantially from a first end 2a to a second end 2b of the elongate body 2.

In other words, the ends of the step 3 are both proximal to (that is to say, close to) respective ends 2a, 2b of the elongate body 2, so as to maximise the action of the conveyor unit 1.

Preferably, the step 3 is shaped in such a way that the feed shoulder 4 is active on the products during rotation of the elongate body 2 in a first in direction and is inactive during rotation of the elongate body 2 in a second direction, opposite to the first.

In other words, the step 3 is shaped in such a way that it has a first, steep face, and a second, gentler-sloping face, that is to say, forming a smaller angle than the first face relative to a circumferential axis. The first face forms the feed shoulder 4.

In other words, in a section orthogonal to the axis of rotation "C", the step 3 forms a substantially sawtooth-style profile.

Therefore, with reference to FIG. 6, the step 3 is shaped in such a way that the feed shoulder 4 is active on the products when the direction of rotation is coming out of the feed shoulder 4, and inactive when the direction of rotation is going into said feed shoulder 4.

In a first embodiment (not illustrated), the step 3 is formed by a slot or by a tooth extending parallel with the axis of rotation "C" along the extension of the elongate body 2 and forming a substantially radial wall, that is to say, the feed shoulder 4.

Alternatively, the step could be formed by a plurality of teeth projecting from the profile of the elongate body 2 and aligned with each other (and spaced out) along the axis of rotation "C".

However, in the preferred embodiment illustrated, the step 3 is formed by a plurality of grooves 5 arranged side by side and positioned one after another along said axis of rotation "C".

Therefore, the "step" may be continuous or separate. In other words, in this text the term step refers to any working that provides a feed shoulder, that is to say, a wall extending between an edge proximal to the axis of rotation and an edge distal from it, extending parallel with the axis of rotation "C", whether continuous or separate (i.e.: grooves 5).

It should be noticed that in this text the term "groove" means a notch made in the periphery of the elongate body 2 having limited dimensions, whether parallel with the axis of rotation "C" or transversal to it.

Therefore, each groove 5 comprises at least one wall forming the feed shoulder 4, at least two lateral sides 5a, 5b delimiting the shoulder 4 and at least one bottom wall (partly delimited by the proximal edge 4b of the feed shoulder 4).

Preferably, in each groove 5 the lateral sides 5a, 5b are angled towards a middle portion 5c of the groove 5 (that is to say, the bottom wall) for guiding, during a rotation of the elongate body 2 about its own axis of rotation "C", the agricultural products towards a centre of the groove 5, creating an agricultural product feed effect. In other words, the grooves 5 form agricultural product housing cradles.

In detail, groove 5 has a variable (increasing) cross-section from a zone proximal to the axis of rotation "C" towards a zone distal from said axis "C". Consequently, the middle portion 5c forms a portion of the elongate body 2 with smaller radial extension.

Advantageously, in that way the cross-section restriction causes a feed effect on the agricultural products, facilitating their unloading.

The lateral sides 5a, 5b may extend straight or curved depending on the application.

In the embodiment illustrated, said lateral sides 5a, 5b have opposite curvature away from the groove 5, forming a concave groove.

Alternatively, if the curvature were the opposite, the groove 5 would have a convex shape.

In another embodiment, the lateral sides are substantially linear, giving the groove 5 a trapezoidal or triangular cross-section.

Therefore, the grooves 5 are formed by an alternating series of portions with larger diameter and portions with smaller diameter which are connected to each other by angled profiles. Said angled profiles are formed by the lateral sides 5a, 5b of the grooves 5. In fact, the lateral sides 5a, 5b join each portion with smaller radial extension (that is to say, the middle portion 5c) to the adjacent portions with larger radial extension.

To make its action more effective, the elongate body 2 preferably comprises at least two steps 3 positioned one after another along a circumferential line.

Therefore, in that embodiment the elongate body 2 comprises, along its periphery, a series of apexes (formed by the distal edges 4a of the shoulders 4) and notches (formed by the proximal edges 4a of the shoulders 4).

In other words, with reference to a cross-section plane orthogonal to the axis of rotation "C" (FIG. 6), the elongate body 2 has two steps 3 positioned one after another, which preferably have a sawtooth shape.

Therefore, in the preferred embodiment, the elongate body 2 has two rows of grooves 5 which are substantially parallel with each other, in which each groove 5 of one row is aligned with the groove 5 of the adjacent row along a circumferential line.

In light of this, the two grooves 5 which are aligned along the circumferential line form a circumferential channel 6 extending over a predetermined angular extension along the periphery of the elongate body 2.

Therefore, the elongate body 6 comprises a plurality of circumferential channels 6 arranged side by side one after another along the axis of rotation "C".

Each channel 6 is therefore provided with a plurality of notches transversal to a circumferential line of extension of it, which are formed by the steps 3 and which form the radial feed shoulders 4 for the agricultural products.

In this text, the expression "circumferential channels" refers to channels extending around the axis of rotation "C" of the elongate body 2. Said channels define a trajectory extending around said axis of rotation "C" over a predetermined angular extension and are side by side along the same axis (parallel with the axis of extension "A").

Therefore, along the elongate body 2 an alternating series is formed of portions with larger radial extension (relative to said axis of rotation "C"), formed by the lateral sides 5a, 5b of the grooves 5, and portions with smaller radial extension, formed by the middle portions 5c of the grooves.

In the embodiment illustrated, the elongate body 2 is also provided with a longitudinal slot or milled portion 7 extending parallel with the axis of rotation "C". Said milled portion 7 is positioned operatively downstream of the step 3 or the steps 3.

In other words, with reference to a cross-section plane orthogonal to the axis of rotation "C" (FIG. 6), the elongate body 2 has a milled portion 7 positioned after the step 3 or the steps.

It should be noticed that the term "milled portion" does not refer solely to a slot made by milling, but to any slot made in any way.

It should be noticed that the milled portion 7 also forms a radial shoulder 7a, preferably less pronounced than the feed shoulder 4 formed by the step 3 (or by the steps).

Preferably, the elongate body 2 comprises two milled portions 7 one after another.

In the embodiment illustrated, along its own periphery the elongate body 2 comprises two steps 3 and two milled portions arranged one after another over a predetermined angular extension.

The elongate body 2 preferably comprises at least one peripheral tooth 8 opposite to the step 3.

Advantageously, said tooth 8 allows cleaning of the area of the device 100 below the elongate body 2, which during rotation of the elongate body about the axis of rotation "C" could become clogged with products.

More precisely, the tooth 8 is formed, similarly to the steps 3, by a plurality of cradles 8a arranged side by side along the axis of rotation "C". It should be noticed that said cradles 8a are aligned with the respective grooves 5 along a circumferential line.

In terms of the materials, the conveyor unit may be made of metal, rubber or other suitable materials. In the preferred embodiment, the conveyor unit 1 is preferably made or coated with a resin or other material which is very resistant to wear.

In some embodiments, the conveyor unit 1 may be of the modular type. Alternatively, it may be made by milling a solid workpiece (that is to say, working a substantially cylindrical body to obtain the steps 3 and/or the grooves 5).

Figure 7:
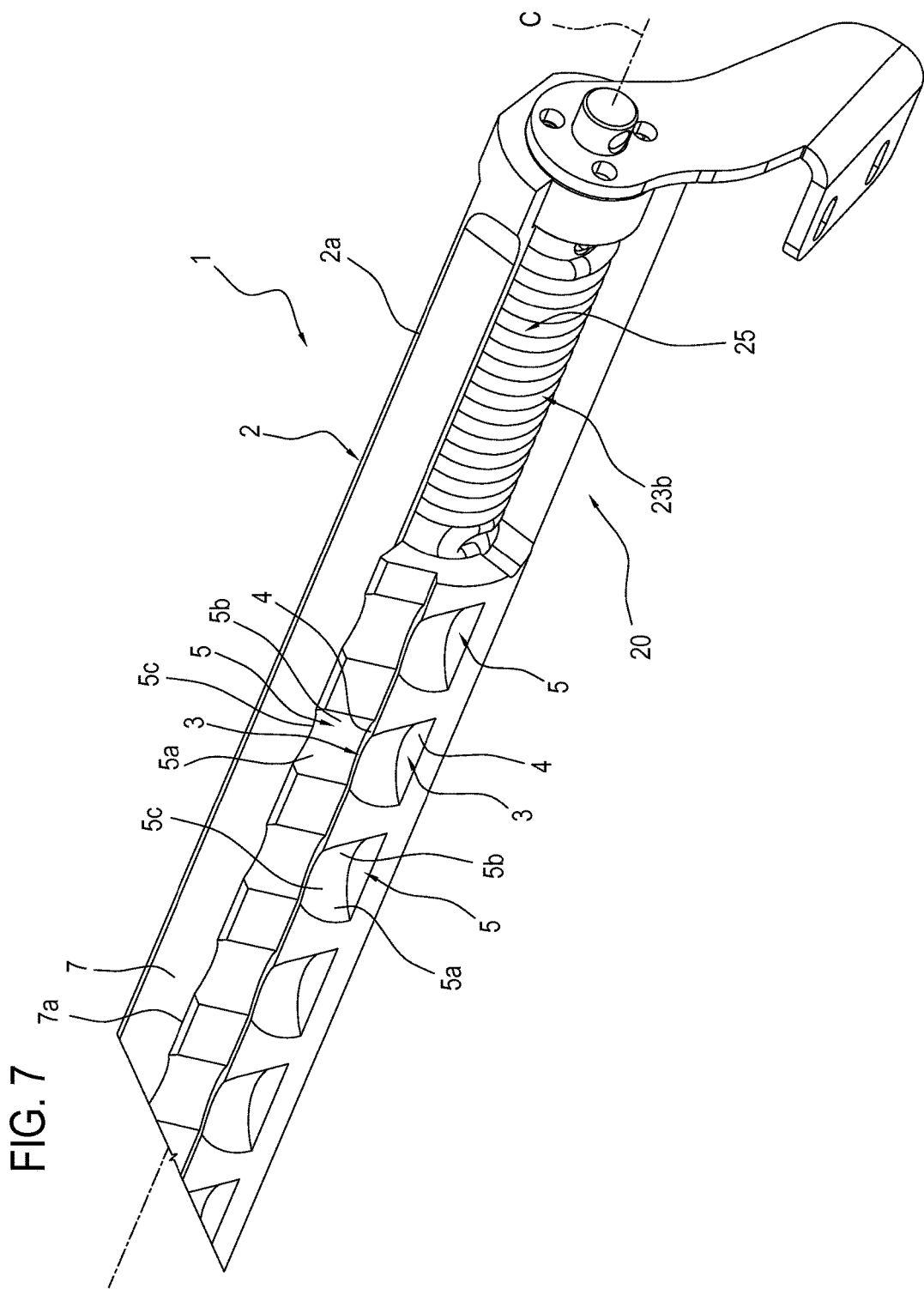
FIG. 7 is a perspective view of the conveyor unit of FIG. 4 with some parts cut away to better illustrate others.

In an alternative embodiment (with reference to FIGS. 7, 7A), the elongate body 1 comprises a plurality of modular rollers 8 which are rigidly connected to each other along the axis of rotation "C" to form the grooves 3.

Preferably, each roller has a central portion with larger diameter, forming a portion of the elongate body 2 with larger radial extension, and two tapered lateral portions, forming the lateral sides 5a, 5b of two adjacent grooves 5.

Consequently, in the embodiment illustrated, each roller is connected to the adjacent roller at the middle zone 5c of each groove 5.

In that embodiment, each roller has a polygonal axial cavity to allow its movement and/or connection by means of a suitable shaft which is shaped to match it.

Alternatively, each roller could be connected to the adjacent one by means of suitable joints.

In an alternative embodiment (not illustrated), the rollers could have a substantially "H"-shaped cross-section, each forming a respective groove 5 of the elongate body. In that case, the rollers are connected to one another at the portions with larger radial extension.

In a further embodiment, preferably, moreover, the elongate body 2 is shaped to generate an alternating motion of the lateral sides 5a, 5b of each groove 5, that is to say each channel 6, during a rotation of the elongate body 2 about its own axis of rotation "C". Advantageously, in that the way the lateral sides 5a, 5b autonomously clean the respective groove 5 (as well as the portion with larger radial extension).

In other words, the portions of the elongate body 2 with larger radial extension (which laterally delimit the grooves 5 or the channels 6) are shaped to move in such a way as to define an alternating motion at an entry edge of the groove 5.

The expression "entry edge" refers to a zone opposite the release point "D" where the agricultural products make contact with the groove 5.

For that purpose, a trajectory of extension of each circumferential groove 5 is set at an angle which is different to 90° relative to said axis of rotation "C" of the elongate body 2.

Consequently, the lateral sides 5a, 5b of each groove 5 extend at that angle. In other words, a middle plane of the groove 5 extends at an angle (therefore is offset) relative to a plane of rotation of the elongate body 2 (or a plane orthogonal to the axis of rotation).

More precisely, each portion with larger radial extension (or diameter) has a circumferential line of extension which is set at an angle of between 2° and 15° relative to a the plane of rotation of theelongate body 2 (that is to say, set at an angle of between 75° and 88° relatie to the axis of rotation "C").

Advantageously, in that way each portion with larger radial extension (and each lateral side 5a, 5b) during rotation of the elongate body 2 defines an oscillating movement centred at the axis of rotation "C".

In detail, opening the circular profile of each portion with larger radial extension into a plane, it has a curved extension in such a way that once wound around the axis of rotation "C" again it forms an annular projection which is set at an angle to the plane of rotation.

In that embodiment, the grooves 5 (and therefore the portions with larger radial extension) are parallel with each other (that is to say, have the same angle, if they are angled).

Alternatively, they could be positioned with alternating angles, in such a way that during rotation two adjacent portions with larger radial extension define an alternating axial movement towards and away from one another.

Advantageously, in that way the portions with larger diameter (and therefore the lateral sides 5a, 5b), when in the closest position actively operate by pulling on the agricultural products, pulling them into the groove 5.

Figure 2:
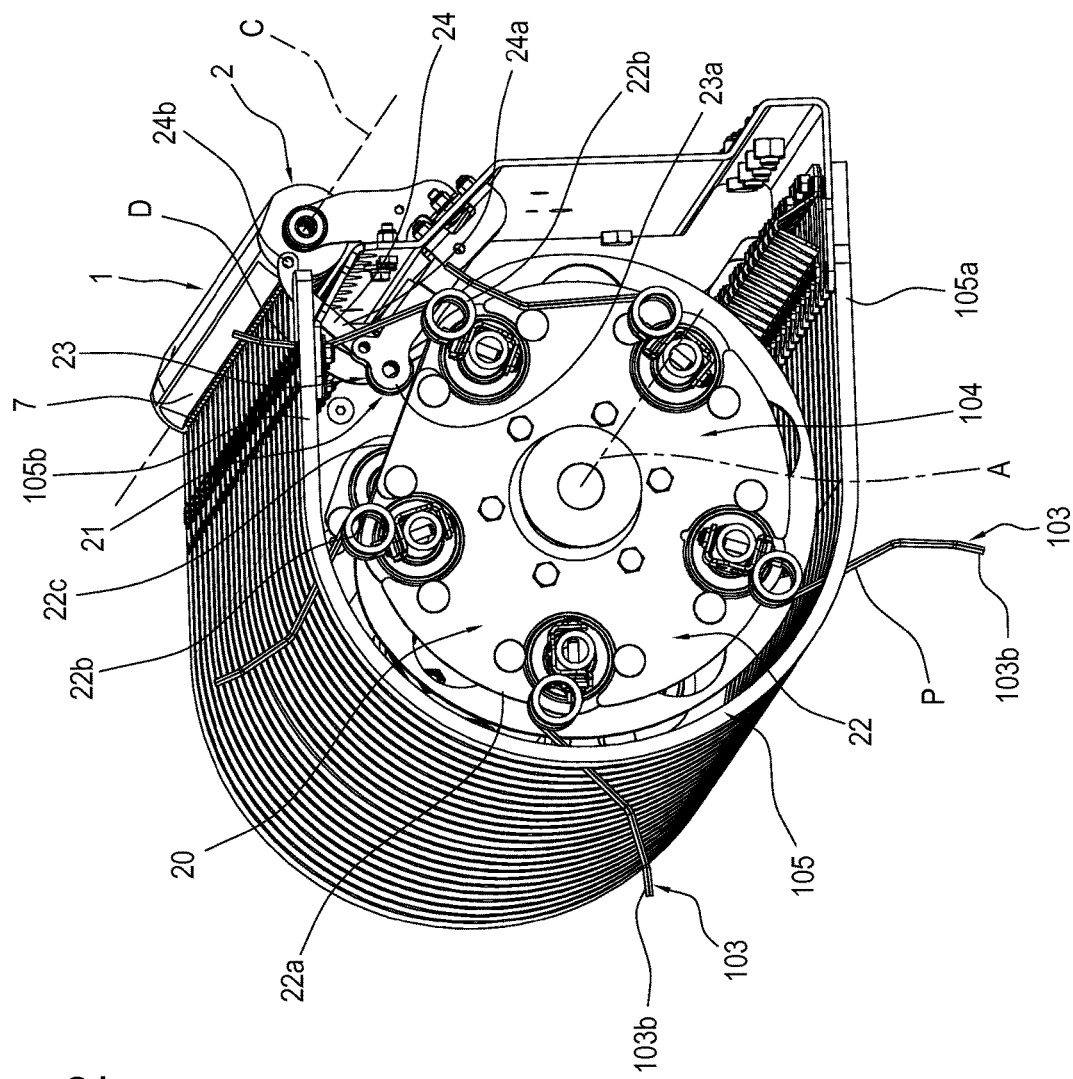
FIGS. 2 and 3 are a perspective view and a side view of a portion of the device of FIG. 1, with some parts cut away to better illustrate others.
Figure 3:
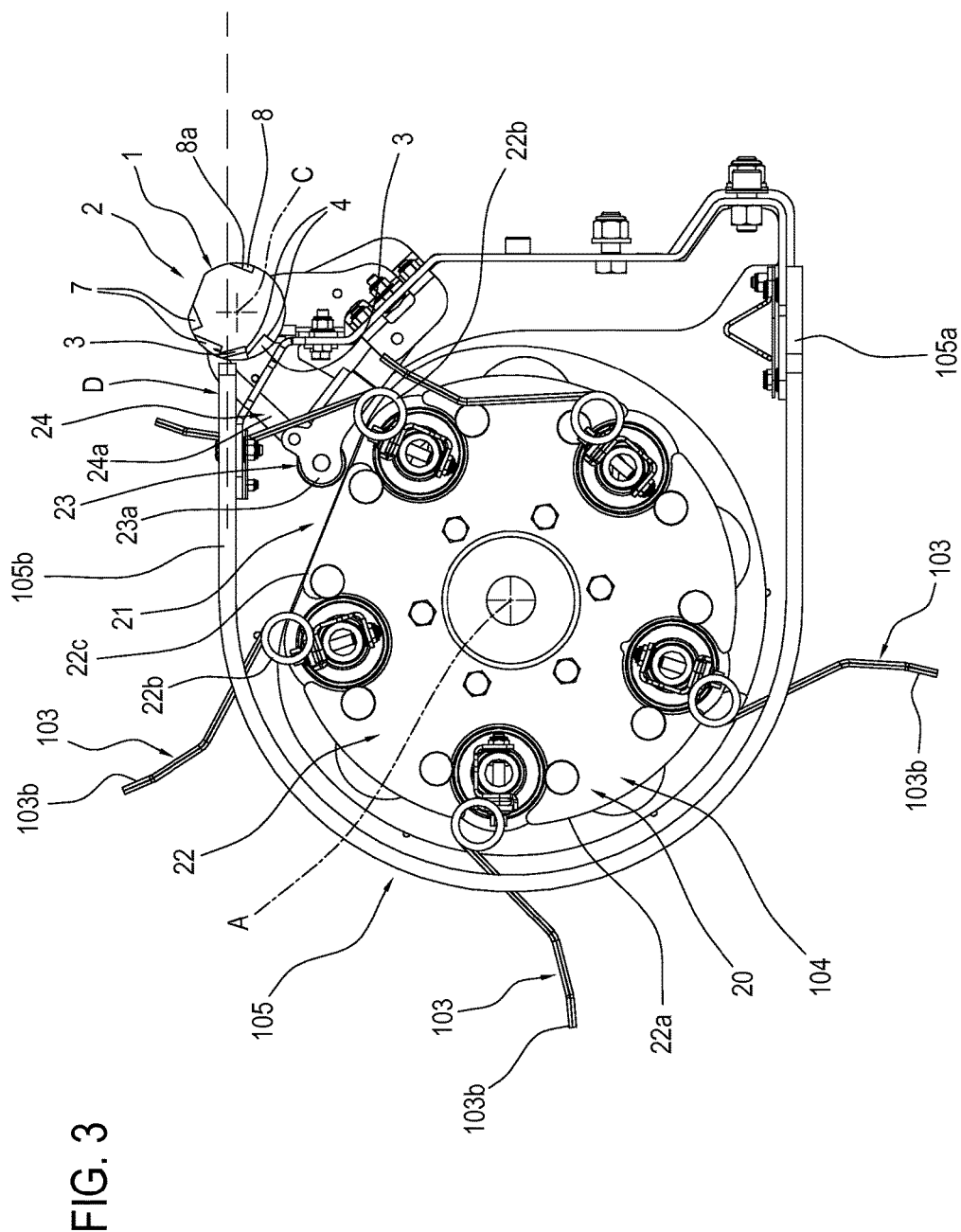

With reference to FIGS. 2 and 3, it should be noticed that preferably each groove 5 of the elongate body 2 of the conveyor unit 1 is opposite a respective release point "D" of a harvesting element 102 and is aligned with said trajectory.

In other words, the plane of rotation "E" of each harvesting element 102 is incident with a respective groove 3 (in particular with a middle section of it).

Therefore, a line joining the release point "D" of one harvesting element 102 and the respective groove 3 lies in said plane of rotation "E" (that is to say, orthogonal to the line of extension "A").

In the preferred embodiment, the axis of rotation "C" of the elongate body 2 of the conveyor unit 1 is substantially opposite to and coplanar with an end stretch 105b of each band 105 located at the release point "D", that is to say, the upper end stretch 105b.

Therefore, the axis of rotation "C" is aligned with said end stretch 105b.

The expression "aligned with" means that the axis of rotation is positioned outside a transversal dimension of the band 105 (that is to say, the area subtended by the band 105) along a projection of the upper end stretch 105b. Advantageously, in that way optimisation between the feed effect and the cleaning effect of the conveyor unit 1 is possible.

It should be noticed that the expression "aligned with" also defines a range of possible positions for positioning of the elongate body 2 (and in particular the axis of rotation "C").

Preferably, said range is variable from a first limit position, in which the upper end stretch 105b of the band 105 is positioned at a tangent height greater than a maximum diameter of the elongate body 2, to a second limit position, in which the upper end stretch 105b of the band 105 is positioned at a tangent height less than the maximum diameter of the elongate body 2.

However, preferably, the axis of rotation "C" is aligned with the main axis of extension "A" of the frame 101, positioned at a height such that the elongate body 2 is at least partly projecting above an end stretch 105b of each band 105 and located at the release point "D".

In the embodiment illustrated, the harvesting device 100 comprises unloading means 106 for unloading the agricultural products harvested, located downstream of the conveyor unit 1 and designed to convey the agricultural products and release them at the side (or if necessary at the back) of the pulling vehicle "M".

In the preferred embodiment, the device 100 (and in particular the unloading means 106) comprises a conveyor belt 106a located and operating downstream of the conveyor unit 1, the belt forming a supporting surface for the agricultural products harvested and fed by the conveyor unit 1.

In particular, said conveyor belt 106a forms a supporting surface which is mobile along the main line of extension "A" so that it can release the agricultural products at the sides of the pulling vehicle "M".

Therefore, the conveyor unit 1 extends parallel with the frame 101 and with the conveyor belt 106a and is interposed between them.

It should be noticed that the expression "conveyor belt" 106a refers to any cyclical movement apparatus, able to form a mobile supporting surface for the products, for example a chain, a tracked apparatus or the like.

Advantageously, the use of a conveyor unit 1 according to this invention upstream of a conveyor belt 106a increases the forcefulness of the device on the products, facilitating their unloading.

Alternatively, in an embodiment not illustrated, the device 100 could be coupled to a chamber for receiving the agricultural products positioned operatively downstream of the conveyor unit 1, which also in that case would be interposed between the harvesting elements 102 and the receiving chamber.

It should be noticed that the axis of rotation "C" of the conveyor unit 1 could be eccentric. In fact, in some embodiments (not illustrated) the eccentricity of the axis of rotation "C".

Said conveyor unit 1 could be free to rotate about its own axis of rotation "C" (operating substantially by friction with the products), or driven by an actuator.

In a first embodiment, said actuation is dedicated to the conveyor unit 1 (it may be either electric or hydraulic).

Alternatively, the actuation could be shared with the conveyor belt 106a or with the system 104, by means of suitable motion transmission systems.

However, preferably, the conveyor unit 1 (that is to say, the device 1) comprises movement means 20 designed for rotating the elongate body 2 about the axis of rotation "C" with alternating motion in a first direction and a second direction which are opposite to one another.

Advantageously, in that way it is possible to maintain the forcefulness of the unit on the products thanks to the shape of the step 2 and at the same time keep the release point "D" clean thanks to the alternating movement. In particular, the movement means 20 comprise a transmission unit 21 operatively interposed between the movement system 104 (previously described) and the elongate body 2.

Said transmission unit 21 is designed to convert the repetitive rotary motion of the harvesting elements 103 into an alternating rotary motion of the elongate body 2.

In other words, the transmission unit 21 is a motion converter mechanism.

In the preferred embodiment, the movement means 20 (and in particular the transmission unit 21) comprise a cam profile 22 able to rotate together with the movement system 104 about said axis "A" and a feeler 23 placed in contact with said cam profile 22 for moving between a first position and a second position.

Therefore, the cam profile 22 is rigidly connected to the movement system 104 for rotating with it.

The feeler 23 comprises a contact element 23a, or cam follower, associated with retaining means 23b designed to keep the contact element 23a abutted against the cam 22, to follow its profile moving between the first and second positions.

Preferably, the feeler 23, in particular the contact element 23a, is kept in contact with the cam profile 22 by elastic retaining means 23b.

In the preferred embodiment, the retaining means 23b are (torsion) springs 25 associated with the elongate body 2.

Preferably, said torsion springs 25 are positioned inside the elongate body 2.

The feeler 23 is connected to the elongate body 2 in such a way as to drive its rotation between a first angular position, corresponding to the first position of the feeler 23, and a second angular position, corresponding to the second position of the feeler 23.

In other words, the feeler 23 is an actuator unit of the elongate body 2 since it imparts the movement to it.

Therefore, the elongate body 2 is mobile between a first angular position, in which the step 3 is (or the steps are) positioned at a height lower than the second end 105b of the band 105, and a second angular position in which the step 3 is (or the steps are) positioned at a height higher than the second end 105b of the band 105.

In contrast, in both angular positions, the milled portion 7 is (or the milled portions are) positioned at a height higher than the second end 105b of the band 105.

In fact, that movement allows the milled portions 7 to be made continuously, without the need to make the grooves 5.

For that purpose, preferably, the feeler 23 comprises a rod 24 extending between a first end 24a, positioned in contact with the cam profile 22, and a second end 24b, hinged to the elongate body 2 at a point which is eccentric relative to the axis of rotation "C" so as to impart a rotation to it.

In other words, the rod 24 behaves like a connecting rod which imparts the movement to the crank (arm between the eccentric point and the axis of rotation "C").

To move the feeler 23 between the first and second positions, as already indicated, the shape of the cam profile 22 has been specially designed.

In the preferred embodiment, the cam profile 22 comprises at least a circular portion 22a extending over a predetermined angular extension between two end points 22b and at least a bevelled portion 22c connecting said end points 22b.

In other words, the cam profile 22 is an annular body provided with a circular half-part (circular portion 22a) and a bevelled or substantially straight half-part (bevelled portion 22c).

Alternatively, there could be two or more bevelled portions 22c to increase the frequency of movement of the elongate body 2.

It should be noticed that the feeler 23 is in the first position when it is in contact with the circular portion 22a and is in the second position when it is in contact with the bevelled portion 22c.

Advantageously, thanks to the movement means described above, it is possible to impart to the elongate body 2, that it to say, to the conveyor unit, an alternating movement in a quite economical and simple way, without the need to implement and mount complex and expensive hydraulic/pneumatic actuators on the device.

The invention achieves the preset aims and brings important advantages.

In fact, the use of such a conveyor unit positioned downstream of the harvesting elements increases the performance and efficiency of the harvesting device, facilitating the transfer of products from the prongs to the discharge means (in particular to the conveyor belt).

Moreover, the presence of grooves which have a variable cross-section increases the feed effect on the products.

Furthermore, the fact that the step forms a feed shoulder and is substantially sawtooth-shaped, together with the alternating movement imparted to the elongate body, makes the conveyor unit self-cleaning, since the oscillation of the feed shoulders of the grooves prevents product sediments.

What is claimed is:

1. A device for harvesting long agricultural products such as grass, straw, legumes, biomass products and the like, of the type which can be pulled by a pulling vehicle (M), comprising:
   a frame (101) having a main axis of extension (A) which, during use, is kept transversal to the axis of movement of the pulling vehicle (M);
   a plurality of agricultural product harvesting elements (102), each in turn equipped with at least one long harvesting prong (103);
   a movement system (104) for moving each of the harvesting elements (102) along a closed trajectory surrounding the main axis of extension (A), where the closed trajectory comprises a stretch for conveying the agricultural product between a point (P) where the product is picked up from the ground by the long prongs (103) and a point (D) where the agricultural product is released by the prongs (103);
   a plurality of bands (105) fixed to the frame (101), arranged one after another along the main axis of extension (A) and spaced out in such a way that each harvesting element (102) is at least partly interposed between two bands (105) located one after the other, characterised in that it comprises a conveyor unit (1) comprising an elongate body (2) extending along its own axis of rotation (C) and provided with at least one peripheral step (3) forming an agricultural product feed shoulder (4) extending, along an axis which is substantially radial relative to said axis of rotation (C), between an edge (4a) proximal to the axis of rotation (C) and an edge (4b) distal from the axis of rotation, wherein said conveyor unit (1) is located close to the release point (D) and positioned in such a way that its axis of rotation (C) is aligned with said main axis of extension (A) of the frame (101), positioned at a height such that the elongate body (2) is at least partly projecting above an end stretch (105b) of each band (105) and located at the release point (D).

2. The device according to claim 1, characterised in that said elongate body (2) is positioned in such a way that its axis of rotation (C) is coplanar with said end stretch (105b) of each band (105) located at the release point (D).

3. The device according to claim 1, characterised in that it comprises movement means (20) designed for rotating the elongate body (2) about the axis of rotation (C) with alternating motion in a first direction and a second direction which are opposite to one another.

4. The device according to claim 3, characterised in that said movement means (20) comprise a transmission unit (21) operatively interposed between the movement system (104) and the elongate body (2) and designed to convert the repetitive rotary motion of the harvesting elements (103) into an alternating rotary motion of the elongate body (2).

5. The device according to claim 3, characterised in that the movement means (20) comprise a cam profile (22) able to rotate together with the movement system (104) about said axis (A) and a feeler (23) placed in contact with said cam profile (22) for moving between a first position and a second position; said feeler (23) being connected to the elongate body (2) in such a way as to drive its rotation between a first angular position, corresponding to the first position of the feeler (23), and a second angular position, corresponding to the second position of the feeler (23).

6. The device according to claim 5, characterised in that said feeler (23) comprises a rod (24) extending between a first end (24a), positioned in contact with said cam (22), and a second end (24b), hinged to the elongate body (2) at a point which is eccentric relative to the axis of rotation (C) so as to drive its rotation.

7. The device according to claim 5, characterised in that the feeler (23) comprises a contact element (23a) associated with retaining means (23b) designed to keep the contact element (23a) abutted against the cam (22), to follow its profile moving between the first and second positions; said retaining means being formed by one or more torsion springs (25) associated with the elongate body (2).

8. The device according to claim 5, characterised in that said cam profile (22) comprises at least one circular portion (22a) extending over a predetermined angular extension between two end points (22b) and at least one bevelled portion (22c) connecting said end points (22b); said feeler (23) being in said first position when it is in contact with the circular portion (22a) and in said second position when it is in contact with the bevelled portion (22c).

9. The device according to claim 1, characterised in that said step (3) of the conveyor unit (1) extends substantially along the axis of rotation (C) from a first end (2a) to a second end (2b) of the elongate body (2).

10. The device according to claim 1, characterised in that said step (3) of the conveyor unit (1) is shaped in such a way that said feed shoulder (4) is active on the products during rotation of the elongate body (2) in a first direction and is inactive during rotation of the elongate body (2) in a second direction, opposite to the first.

11. The device according to claim 1, characterised in that said at least one step (3) of the conveyor unit (1) is formed by a plurality of grooves (5) arranged side by side and positioned one after another along said axis of rotation (C).

12. The device according to claim 11, characterised in that each groove (5) of the conveyor unit (1) comprises a pair of lateral sides (5a, 5b) angled towards a middle portion (5c) of the groove (5) for guiding, during a rotation of the elongate body (2) about its own axis of rotation (C), said agricultural products towards a centre of the groove (5), creating an agricultural product feed effect.

13. The device according to claim 1, characterised in that the elongate body (2) of the conveyor unit (1) comprises at least one peripheral tooth (8) opposite to the step (3) designed to keep clean a zone of the device (100) below the elongate body (2).

14. The device according to claim 1, characterised in that said step (3), in a section orthogonal to the axis of rotation (C), has a sawtooth profile formed by a first, steep face (3a), and a second face (3b), where said first face (3a) forms the feed shoulder (4).

* * * * *